W. J. SMITH.
BALL BEARING RIM LUG.
APPLICATION FILED SEPT 7, 1920.

1,383,435.

Patented July 5, 1921.

Inventor:
Wm. J. Smith
By John C. Higdon
Atty.

UNITED STATES PATENT OFFICE.

WILLIAM J. SMITH, OF EOLIA, MISSOURI.

BALL-BEARING RIM-LUG.

1,383,435.     Specification of Letters Patent.     Patented July 5, 1921.

Application filed September 7, 1920. Serial No. 408,568.

*To all whom it may concern:*

Be it known that I, WILLIAM J. SMITH, a citizen of the United States, residing at Eolia, Pike county, Missouri, have invented certain new and useful Improvements in Ball-Bearing Rim-Lugs, of which the following is a specification containing a full, clear, and exact description, reference being had to the accompanying drawings, forming a part thereof.

My invention consists in the novel construction and combination of parts hereinafter particularly described and distinctly claimed.

One of the objects of my invention is to provide an improved ball-bearing mechanism for the nuts of automobile tire-lugs, and for other purposes; whereby the nut may be more quickly and easily tightened and loosened, whenever required, and yet will be securely locked after it has been tightened, as well as secured against accidental loss after it has been loosened.

Other objects and advantages of the invention will appear in the following description.

Figure 1:
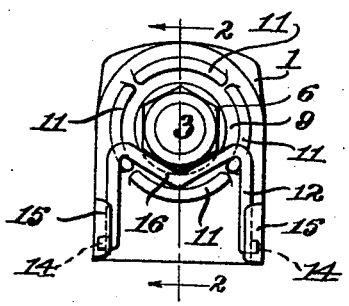
Figure 1 is a front elevation of a ball-bearing tire-lug and nut-lock, constructed in accordance with my invention.

The numeral 1 designates the base-plate of the tire-lug, the same having the usual lateral lug 2 for engaging the rim of the tire, in the well-known manner.

Said base-plate is perforated, as usual, for the passage therethrough of the bolt 3, and a circular depression 4 is formed in the outer face of said base-plate 1 at a slight distance from, and surrounding the said bolt perforation.

A series of balls 5 are seated in said circular depression 4, which I will hereinafter designate as the ball-race, and a suitable nut 6 is provided at its inner end with a circular marginal flange 7 in the inner face of which is a nut ball-race 8 which is seated upon the said balls 5, so that when said nut is tightened up its thrust will be taken by the ball-bearing thus provided, and the nut may be tightened or loosened very quickly and easily upon the exertion of little power.

A washer 9 has its outer margin curved inwardly, and said washer is mounted upon the outer surface of the said nut flange 7, with said outer margin of said washer seated upon a circular abutment or off-set 10.

Figure 2:
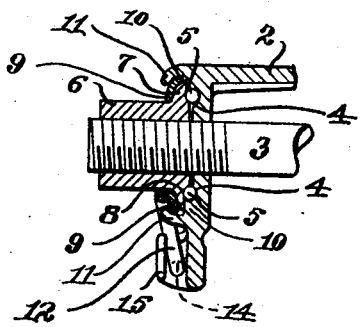
Fig. 2 is a vertical section of same, taken on the line 2—2 of Fig. 1.
Figure 3:
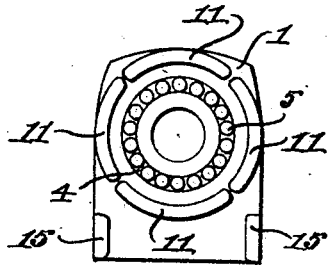
Fig. 3 is a top plan view of the tire-lug, with the nut, washer, and locking-spring removed.

A series of curved upstanding fastening-lugs 11 are formed integral with the outer face of the said base-plate 1, and are adapted to have their outer free edges battered or bent inwardly, as shown in Fig. 2, to overhang the said washer 9, and engage the same, to fasten said washer and said nut in place, and prevent them from being accidentally lost when the nut is loosened, and the tire-lug is removed from the automobile wheel.

The said off-set or abutment 10 prevents the said washer from bearing too tightly upon the said flange 7 of the nut 6, when the said fastening-lugs are forced against said washer, in battering or bending said lugs, as above described; and possible binding, breakage, or crushing of the steel balls 5 is thereby prevented.

To positively lock the nut 6 against loosening after it has been tightened, I provide the locking-spring 12, as will now be described.

A nut seated upon a ball-bearing would move so easily and become loosened so quickly that, without a positive lock, the device would be worthless.

Figure 4:
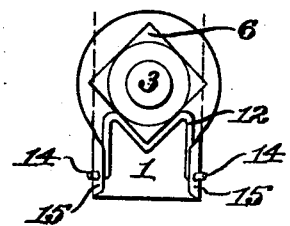
Fig. 4 is a front elevation of a modified form of my invention.

The locking-spring 12 is preferably made of brass or other non-corrosive spring-wire, bent into the shape of a letter M, as shown in Figs. 1 and 4, with its parallel arms provided at their ends with out-turned pintles 14, which are sprung into bearing-apertures formed in opposite perforated ears 15 extending from the outer face of the said base-plate 1, and the body 16 which connects the upper ends of the said parallel arms is bent in V-shape, to fit the shape of the said nut 6 and securely hold said nut against loosening during use, when the locking-spring is thrown to its normal locking position, which is that in which it is herein shown.

The outer free edges of the said perforated ears 15 are bent inwardly, so that they overhang the said parallel arms of the locking-spring 12, and thereby hold the latter in a locking position with relation to the said nut 6, and any accidental movement of said spring is effectually prevented.

When it is desired to release the locking-spring 12 from the nut 6, the spring is swung outwardly upon its pintles 14 until the nut is cleared, whereupon the nut may be easily loosened by means of the usual wrench.

Figure 5:
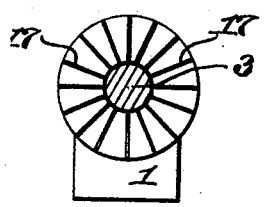
Fig. 5 is a view of the reverse side of the device shown in Fig. 4.

In the modification, shown in Figs. 4 and 5, I have shown my invention in a form adapted to lock the nuts of ordinary bolts, the ball-bearing being omitted, and if the device is to be used as a lock-washer upon railroad-rail joints, the base-plate 1 is made rectangular in form, as shown by dotted lines in Fig. 4, so that the upper edge of said plate will extend upwardly into contact with the head of the rail, and be thereby prevented from turning.

When there is danger of the base-plate 1 turning, in using my invention upon wooden structures or elsewhere, the back face of the base-plate should be corrugated or provided with radial teeth 17, which will bite into the surface of the wood or other structure, and so prevent the turning of the base-plate thereon.

Of course, in locations where the rectangular lower end of the said base-plate 1 can rest upon some fixed object, the upper end may be rounded, as shown in Fig. 5.

The operation of my invention will be readily understood, without further description.

I claim:—

A ball-bearing rim-lug, comprising a base-plate having an integral rim-engaging lug projecting from its inner side, and provided with an annular ball-race upon its outer side; balls in said ball-race; a bolt having screw-threads; and a nut threaded on said bolt and having a ball-race upon its inner face seated on said balls.

WILLIAM J. SMITH.

Witnesses:
I. PHILLIPS,
JOHN C. HIGDON.